(12) United States Patent
Frank et al.

(10) Patent No.: US 7,359,807 B2
(45) Date of Patent: Apr. 15, 2008

(54) MAINTAINING AND MANAGING METERING DATA FOR A SUBSIDIZED COMPUTER

(75) Inventors: Alexander Frank, Bellevue, WA (US);
Mark C. Light, Redmond, WA (US);
Martin H. Hall, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 11/057,266

(22) Filed: Feb. 14, 2005

(65) Prior Publication Data
US 2006/0184590 A1    Aug. 17, 2006

(51) Int. Cl.
*G06F 19/00* (2006.01)
(52) U.S. Cl. .................. 702/61; 702/187; 705/412
(58) Field of Classification Search ............ 702/61, 702/187
See application file for complete search history.

(56) References Cited

U.S. PATENT DOCUMENTS 4,620,150 A * 10/1986 Germer et al. .......... 324/103 R
4,910,692 A * 3/1990 Outram et al. ............ 702/187
5,710,706 A * 1/1998 Markl et al. .............. 705/409
2005/0065880 A1* 3/2005 Amato et al. ............. 705/40

OTHER PUBLICATIONS

Specification as filed for U.S. Appl. No. 11/020,329, filed Dec. 22, 2004.

* cited by examiner

*Primary Examiner*—Hal Wachsman
(74) *Attorney, Agent, or Firm*—Marshall, Gerstein & Borun LLP (57) ABSTRACT

A method and apparatus for saving, retrieving, and adjusting metering data uses information about the period between saves of the metering data to non-volatile memory and other information, for example, a number of recovery events experienced by the computer. The retrieved metering data may be adjusted according to the number of recovery events so that more frequent power interruptions cause metering data adjustments to favor a service provider. The time between data saves may be altered to increase the difficulty of timing attacks. Information about the time between saves, or the period of the save cycle, may also be stored with the metering data for use in the metering data restoration process.

20 Claims, 5 Drawing Sheets

MAINTAINING AND MANAGING METERING DATA FOR A SUBSIDIZED COMPUTER

BACKGROUND

Pay-as-you-go or pay-per-use business models have been used in many areas of commerce, from cellular telephones to commercial laundromats. In developing a pay-as-you go business, a service provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

One possible pay-as-you-go business model measures use based on some measurable unit, such as time, CPU cycles, disk access, data packets transferred, etc. The unit for measurement, may, in some cases, be quite fine, for either technical or business reasons. For example, time may be measured in microseconds because it is a convenient unit for the operating system or other metering circuit to access. Since metering data may be tracked in volatile memory, the system may be required to periodically store the metering data in a non-volatile memory should the power be lost or another catastrophic loss of data occur in volatile memory. However, non-volatile memory, such as disk drive, may be too slow to write data at each "clock tick." Similarly, other non-volatile memory, such as EEPROM, may have a restricted number of write cycles that does not allow writing each "clock tick" to memory over the life of the product. Even when using a fast non-volatile memory, such as battery-backed RAM, encryption processes for securing the data may be too slow to allow writing data as fast as it is updated.

Since each of the above deficiencies in writing metering data to non-volatile memory results in storing the data a rate slower than the metering data is generated, some quantization error may occur between the actual metered data and that written to non-volatile memory. This effect is most evident in the case when the computer shuts down or restarts without writing the current metering data to non-volatile memory. Over time, this quantization error may accrue to the benefit of either the subscriber or the service provider, perhaps substantially. In some cases, the benefit to one party could be so substantial as to invite fraud by the subscriber on one hand or cause subscriber dissatisfaction on the other.

SUMMARY

Following an orderly shutdown, the subsequent power up or restart of the computer will restore metering data representing the actual value at the time of the shutdown. However, following a non-graceful shutdown, due to a power loss, system lock-up, manual restart, etc. the data last stored in non-volatile memory probably does not represent the actual value at the time of the non-graceful shutdown. The extent to which the stored value varies from the actual is a function of the time between writes to non-volatile memory and when the system event occurred during that time. To help ensure that metering data is recovered in accordance with the business model of the service provider, or other subscription underwriter, metering data may be restored, not with the raw value at the last write, but with a value based on the value at the last write and the period between writes. This parametrically-derived value can be adjusted from favoring the subscriber to favoring the service provider using a number of criteria. Since a major event associated with data loss, such as loss of metering data is power loss, the parametrically-derived value can be adjusted in favor of the user initially to reflect a user's lack of control of power outages. However, based on volume and velocity analysis of non-graceful shutdowns, the parametrically-derived value can be re-adjusted to favor the service provider, thereby discouraging subscriber attempts to time an "ungraceful shutdown" to their benefit.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Many prior-art-high-value computers, personal digital assistants, organizers and the like are not suitable for use in a pre-pay or pay-for-use business model as is. As discussed above, simple methods for tracking and storing metering data may not be adequate to discourage fraudulent attempts to get "free time" for the subsidized computer.

Figure 1:
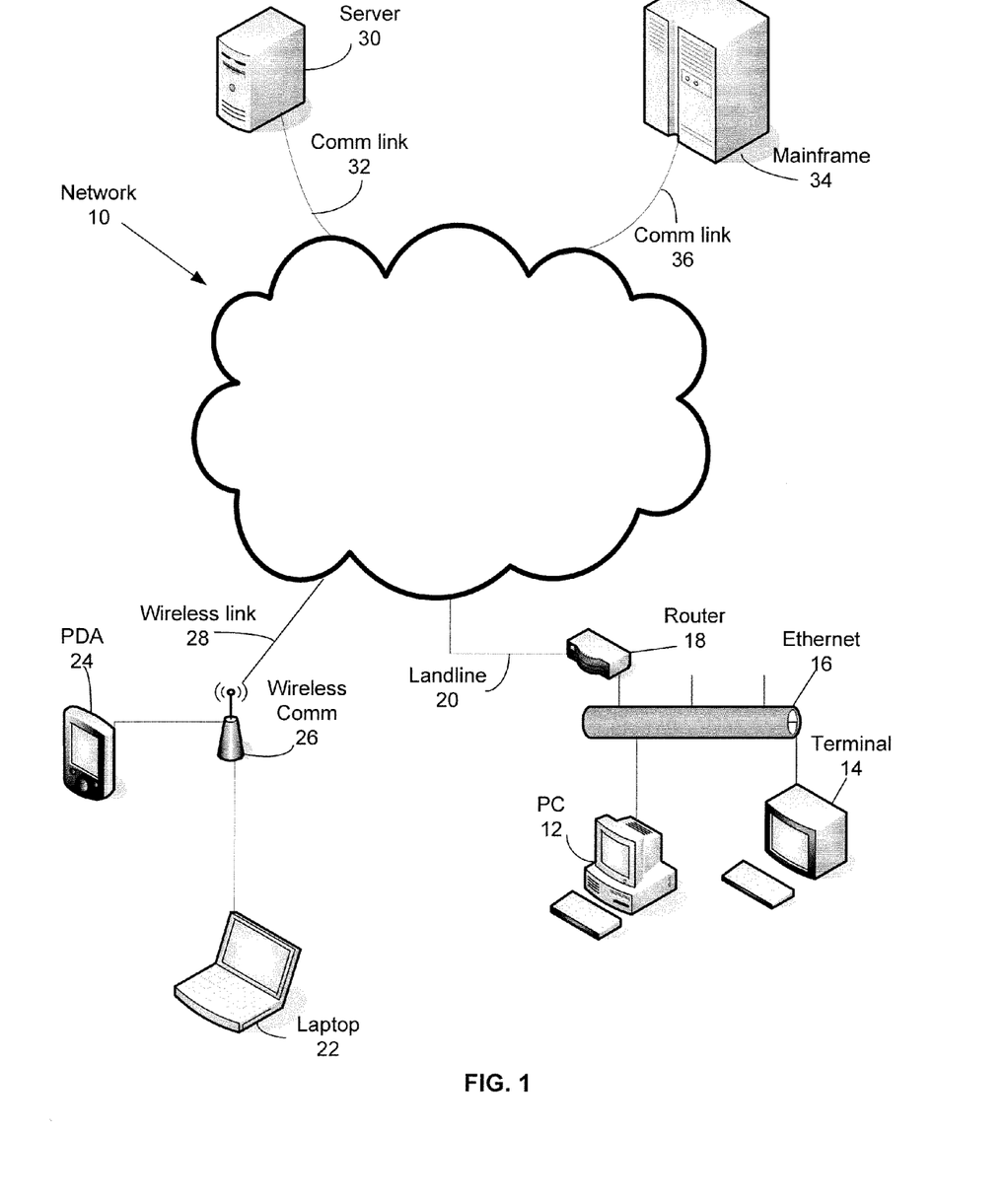
FIG. 1 is a simplified and representative block diagram of a computer network.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
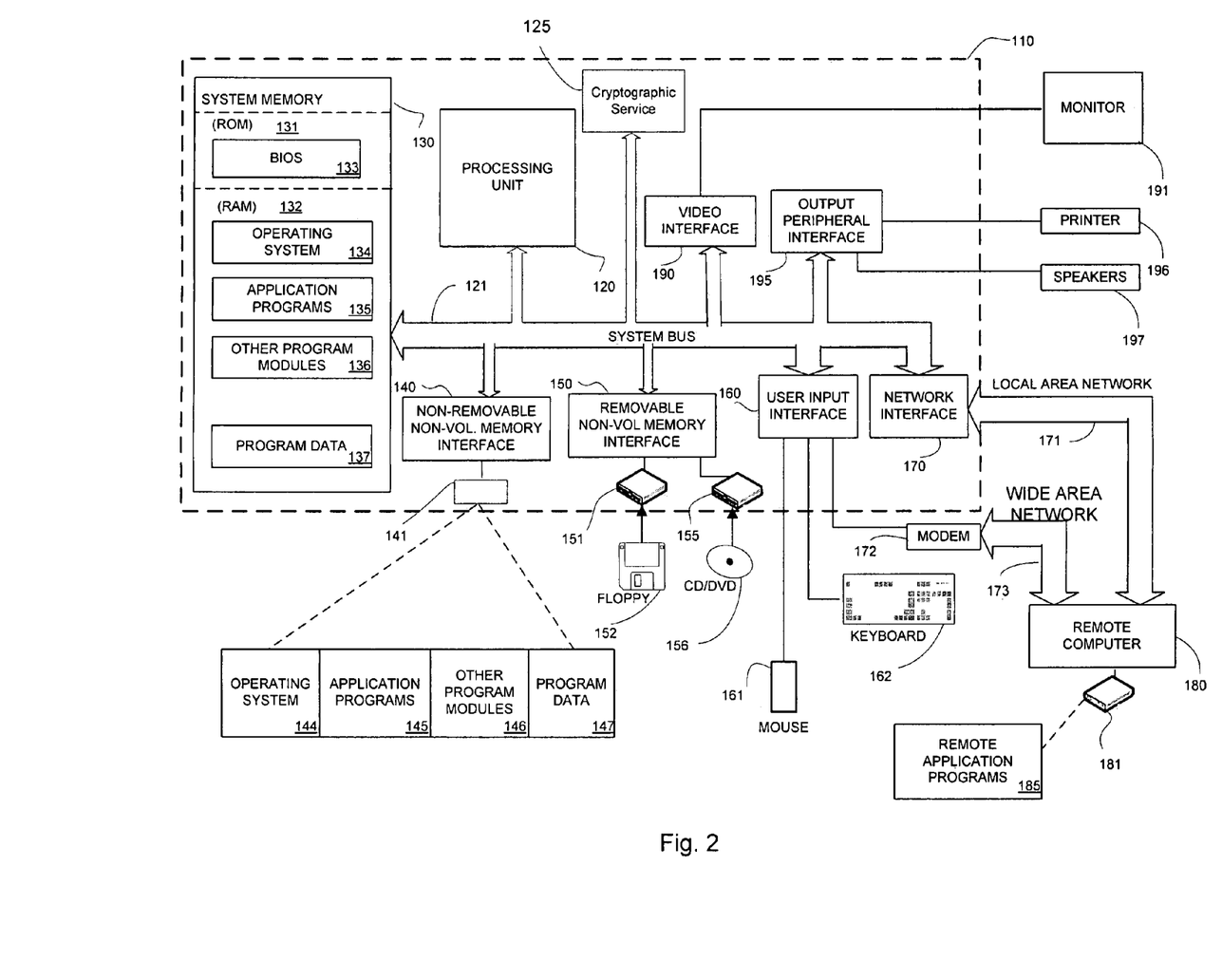
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include cryptographic services 125. Such services may include support for both symmetric and asymmetric cryptographic algorithms, key generation, random number generation and secure storage. Cryptographic services may be provided by a commonly available integrated circuit, for example, a smart chip such as those provided by Seimens™ or STMicroelectronics™.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
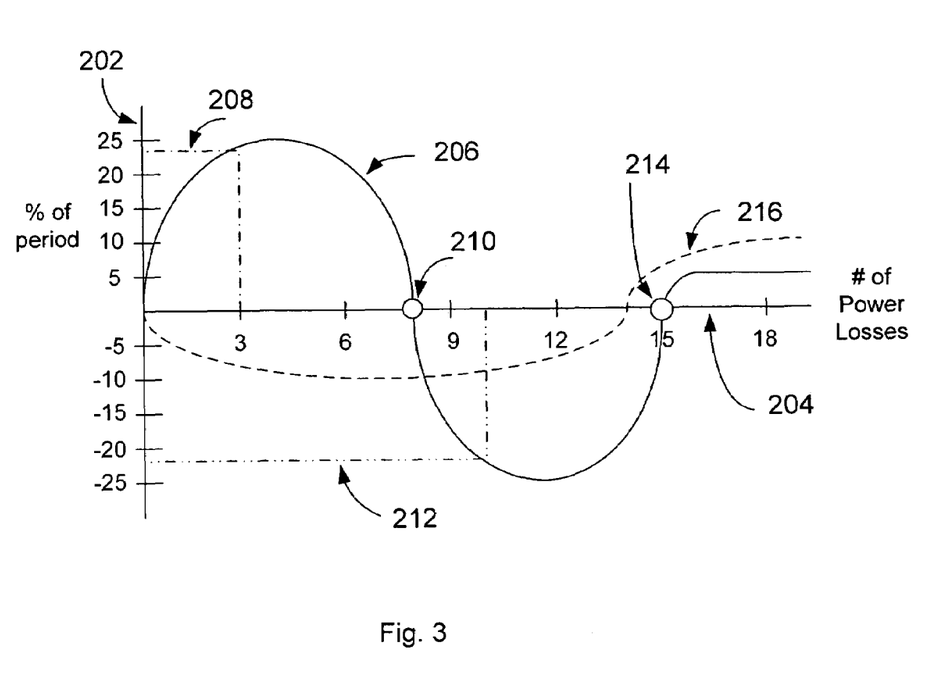
FIG. 3 is a chart depicting adjustment of metering data as a function of recovery events.

FIG. 3, a chart depicting adjustment of metering data as a function of recovery events is discussed and described. For the purpose of this application, we will distinguish between restored metering data and recovered metering data, although in practice, the actual storage location for both may be the same. When metering data is stored in a controlled fashion upon an orderly shutdown, the metering data may simply be restored upon power up. Orderly shutdowns from the standpoint of saving metering data are most easily indicated by setting a flag during the shutdown. For the sake of clarity, the term 'recovered' will be used when discussing the metering data resulting from a non-orderly shutdown or other data loss event in the computer. System events that result in non-orderly shut down may include power loss, manual reset, brown out, electrical discharge, thermal stress, etc. Other events may result in data loss that requires a recovery of metering data. Such events may include system lock-ups due to application or operating system errors, system lock-ups associated with peripherals or peripheral drivers, and deliberate attacks on the metering circuits and processes. For the purpose of this discussion, we will use the term "recovery events" to mean a system event requiring recovery of metering data, as opposed to those normal activities where metering data may simply be restored.

Metering data may be written to non-volatile memory at a given rate, using a convenient example, once every 100 seconds. The period for the write cycle is then 1/rate, or 100 seconds. The y-axis of the graph of FIG. 3 shows, in this exemplary embodiment, a range of percentage of the period from +50% to −50%. Given the example period of 100 seconds, the y-axis range represents +50 seconds to −50 seconds.

The x-axis of the chart represents the cumulative number of recovery events since a starting point. The starting point may be the initial operation of the computer and the number represents total recovery events over the life of the computer. Alternatively, it may be desirable to reset the cumulative number of recovery events to reflect change of ownership, a new subscription period, etc.

Expanding the hypothetical example from above, a computer, such as the computer 110, may have 1000 seconds of pre-paid operation remaining when the metering data is last written to non-volatile memory 141. A recovery event may occur any time during the 100 second period. Should that happen, a prior art implementation might restore the metering data at 1000 seconds. Such a process may invite the subscriber to systematically reset the system after 98 seconds to get "free" usage time, especially as the period gets longer. Alternatively, setting the system to restore the usage time at 900 seconds may be overly restrictive and cause customer dissatisfaction. A simple splitting of the difference, i.e. crediting 950 seconds, will result in parity assuming the recovery events occur in a statistically random fashion. This may not provide enough incentive to discourage attempted fraud.

The curve 206 of FIG. 3 shows an exemplary curve 206 for determining an adjustment to the metering data. In general, the shape of this curve favors the subscriber during initial recovery events. For example, using the same data as above, after the third recovery event, the line 208 shows that the subscriber will be given about a 24% advantage, meaning that when restored, the data will be adjusted 24 seconds from the mid-point of the period, i.e. ½*100 seconds+24 seconds=74 seconds, or a total of 974 seconds restored to the computer 110. However, when the number of resets increases beyond a first value 210, for example, 8, the adjustment may be less than ½ of the period, e.g. at the $10^{th}$ reset line 212 shows a −23% adjustment, or in this example, −23 seconds, giving an adjusted, restored time of 937 seconds. Further recovery events, past a second value 214 eventually result in a slight advantage to the user. It may be desirable that the final state of the adjustment slightly favor the user for the sake of customer satisfaction, but more complex curves, accommodating different criteria, may be implemented.

Obviously, the process works with other shaped curves, for example, curve 216, where the average advantage is to the service provider until the zero crossing. Additionally, it should also be obvious that the shape of the curve and the scale of the axes may be almost infinitely variable, and may be set initially or changed on-the-fly, for example, over network 10, to accommodate observed patterns of user behavior and actual power outages for a given geographical region. Moreover, the y-axis scale may be set to allow adjustment greater than ½ the period, i.e. adjusting the restored metering data to 1050 seconds, if, for example, the service provider wishes to compensate for boot time, which may be sound from business standpoint as long as the user pays for the service and is satisfied with it, and yet this opens a contained and limited opportunity for fraud.

To further discourage fraudulent attempts to gain usage, the period between writes to non-volatile memory 141 may be varied. This may make it more difficult for a subscriber to cause a recovery event in an attempt to gain time since the period for writing metering data is varied. A random number generator, such as one available from a cryptographic circuit 125 may be used to set the duration of the period as often as each period. As discussed further below, both the metering data and the most recent period may be written to non-volatile memory 141. To discourage tampering, the data may also be encrypted before being written to the non-volatile memory 141.

The period for writing metering data may be varied for other reasons, such as one or more system characteristics. A system characteristic that may influence period selection may be the behavior and latencies of the physical memory associated with the metering data write process. For example, the period may be longer overall when slower memory is used, such as electrically erasable programmable read only memory (not depicted) vs. a hard disk drive 141. Also, with some non-volatile-memory and storage technologies, the latencies of write operations may fluctuate considerably. That is, a configuration change may change the memory destination for the metering data: When the system characteristics are changed in this manner, the metering data write period may be updated in response to those changes.

Because the period may vary, perhaps significantly, the above chart shows the y-axis as a percentage of the period, therefore any restored metering data is adjusted in a consistent manner. However, the adjustment curve 206 may be expressed in absolute units, such as seconds to further abstract the adjustment. In an exemplary embodiment, the y-axis distribution may be dynamically adjusted based on various business policies and needs. For example, the model may vary according to the number of previous recovery events, how frequently recovery events occur, the length of time the user has possessed the computer 110, etc. The y-axis distribution may follow arbitrary or probabilistic models, such as normal (Gaussian) or uniform shapes. While FIG. 3 shows curves 206 and 216 starting at x=0, y=0, this is not a requirement.

Figure 4:
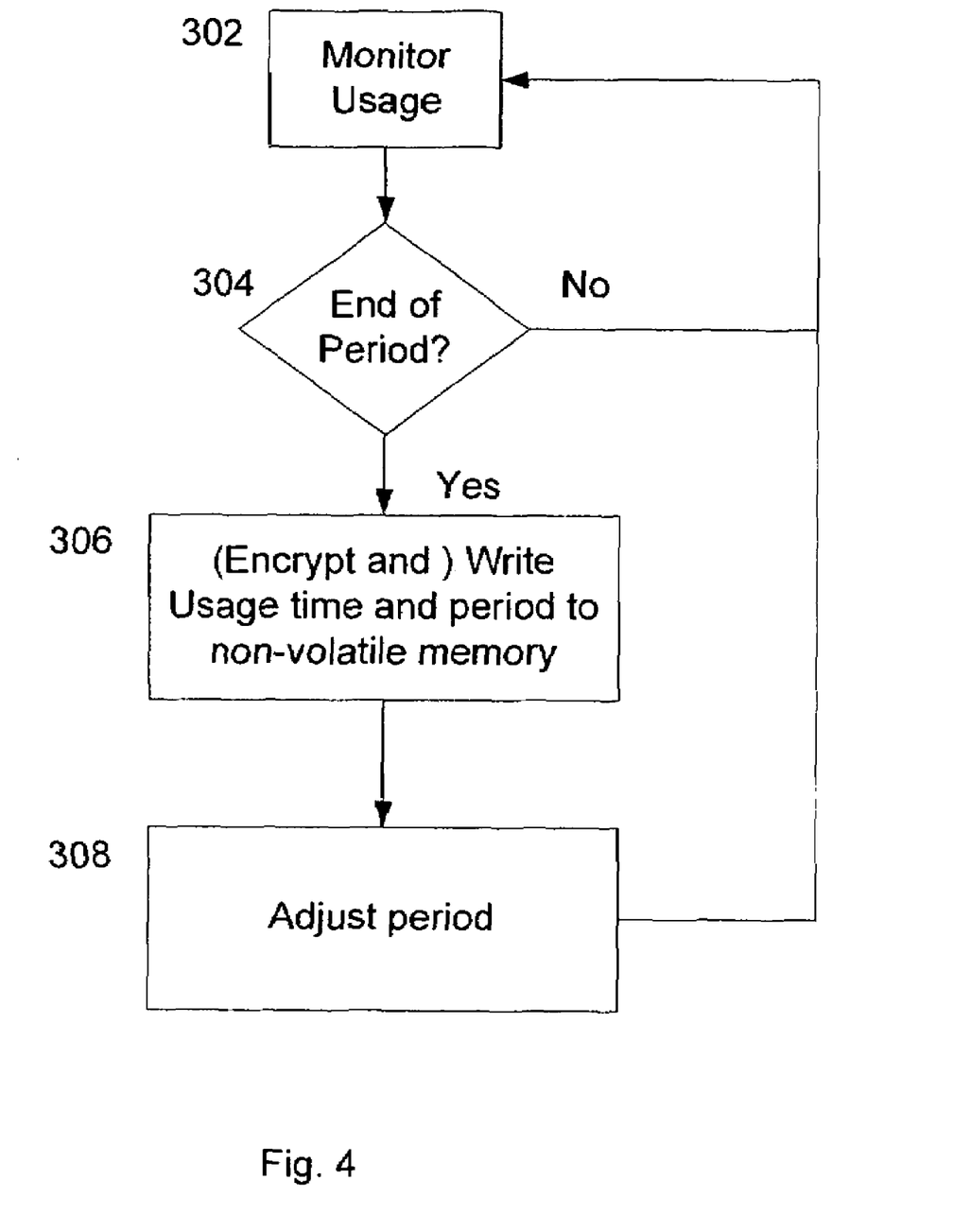
FIG. 4 is a flow chart of a method of recording metering data.

FIG. 4, a flow chart of a method of recording metering data, is discussed and described. Use of the computer 110 may be monitored 302 using metering data. The specific data monitored 302 may be any of those mentioned above, including time. Monitoring may occur at a first rate, for example, one per millisecond. The computer 110 may determine 304 when the end of period occurs, such as the end of an elapsed period of time or when another metric occurs such as a number of cycles of the processor 120. When the period has not expired, execution may return to the monitoring process at block 302.

When the period has expired, the yes branch from block 304 may be taken to block 306. At block 306 the metering data may optionally be encrypted and then written to non-volatile memory 141. In order to correctly implement the algorithm for adjusting the metering data upon recovery, the period information for the current data storage cycle may also be written to the non-volatile memory 141. The period may then be adjusted 308 to vary the period of the write cycle. The use of a random number or other pseudo-random sequence for determining the next period is known in the art. As previously mentioned, the period may be adjusted 308 to discourage abuse of the metering data recovery process. When the period has been adjusted 308, execution may return to the monitoring process at block 302. The monitoring process 302 may run continuously while execution of blocks 304, 306 and 308 occurs.

Figure 5:
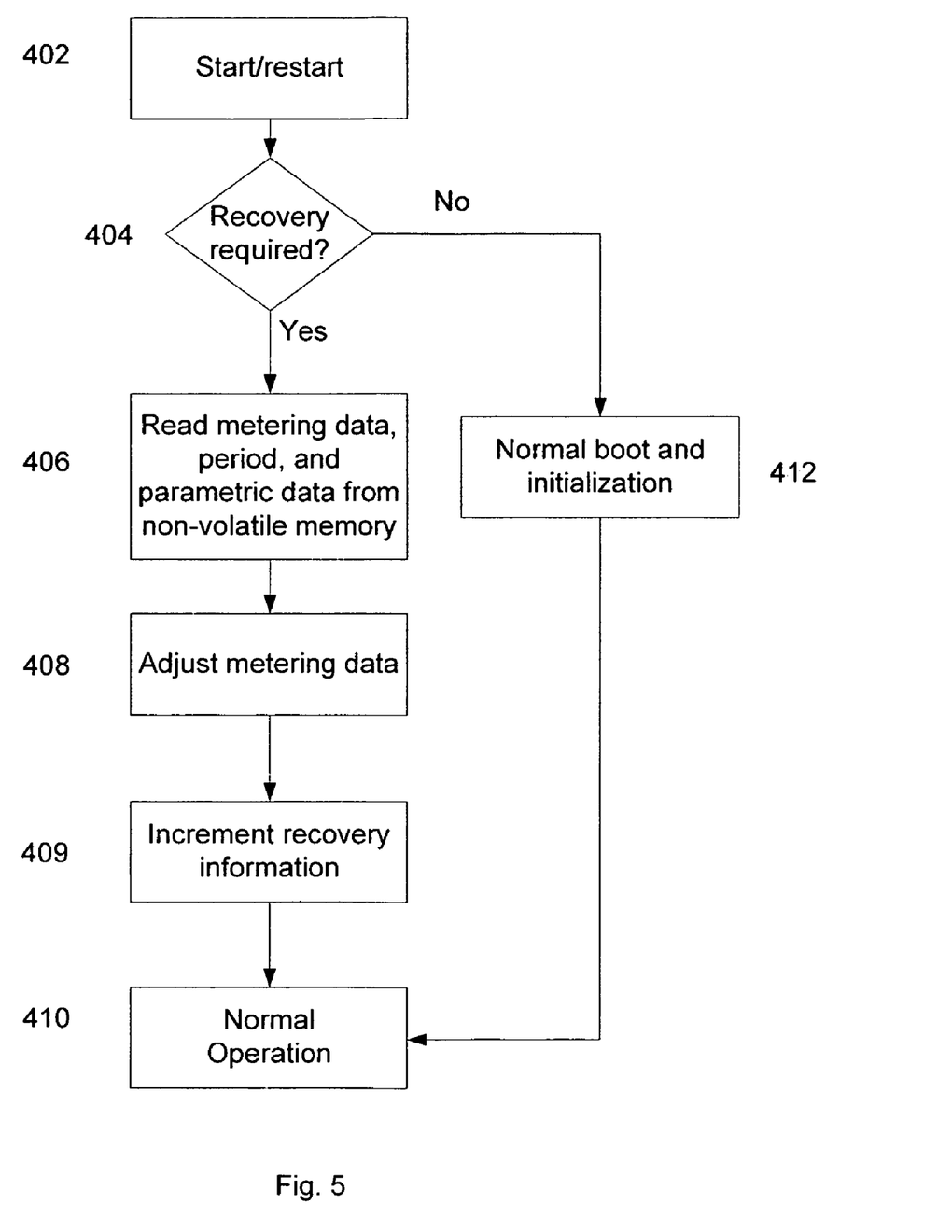
FIG. 5 is a flow chart of a method of recovering and adjusting metering data as a function of the recording period and the number of recovery events.

FIG. 5 shows a flow chart for a method of recovering and adjusting metering data as a function of both the number of resets and the period. When the power is applied and the computer started, or when rebooting/restarting at block 402, the computer 110 may determine at block 404 if the previous shutdown was orderly. When the previous shutdown was not normal and recovery of metering data may be required, as may be indicated by the lack of appropriate flags, execution may follow the yes branch and metering data and period information may be read 406 from non-volatile memory 141. In an exemplary embodiment, other criteria may be applied when determining the adjustment of metering data. Such criteria may include the cumulative number of recovery events, the hours of use of the computer 110, how long the computer 110 has been in use, how long the computer 110 has been in the user's possession, how long the user has been a customer of the service provider, credit standing, etc. When this additional data is used to calculate the adjustment, such data may also be read at block 406. If the data was encrypted before storing, the key may be retrieved and the data decrypted before proceeding. Metering data may adjusted 408 as a function of the period information read from non-volatile memory 141 and optionally, the number of recovery events. Recovery event data may also need to be protected, i.e. encrypted or stored in secure memory to limit manipulation of the recovery event data to take advantage of a favorable point on an adjustment curve, for example, curve 206.

When the metering data has been read and adjusted 408, information associated with the cumulative number recovery events may be updated 409 and normal operation may continue at block 410. Similarly, when the last shutdown was normal, the no branch from block 404 may be taken to block 412 to execute a normal boot and metering data restoration followed by normal operation at block 410.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A computer arranged and configured for managing metering data comprising:
   a metering circuit adapted for maintaining the metering data at a first rate;
   a memory coupled to the metering circuit adapted to store the metering data at a second rate, the first rate higher than the second rate; and
   a processor coupled to the metering circuit and the memory adapted to adjust the metering data to account for lost metering data in proportion to the second rate when recovering metering data from the memory.

2. The computer of claim 1, wherein the proportion is variable.

3. The computer of claim 2, wherein the proportion is a function of one of a number of recovery events, hours of use of the computer, a time of possession of the computer by a user, and a customer status.

4. The computer of claim 2, wherein the proportion is variable following a probabilistic distribution of the second rate used to account for lost metering data.

5. The computer of claim 1, wherein the second rate is variable.

6. The computer of claim 1, further comprising a random number generator wherein the second rate is changed corresponding to an output of the random number generator.

7. The computer of claim 1, wherein the second rate is variable responsive to a system characteristic.

8. A method of restoring metering data comprising:
   updating metering data at a first rate;
   writing the metering data to a non-volatile memory at a second rate;
   retrieving the metering data from the non-volatile memory; and
   adjusting the metering data from the non-volatile memory as a function of the second rate to account for lost metering data caused by a recovery event.

9. The method of claim 8 wherein the first rate is greater than the second rate.

10. The method of claim 8, further comprising counting a number of recovery events and adjusting the metering data from the non-volatile memory as a function of the second rate and the number of recovery events.

11. The method of claim 10, wherein the adjusting the metering data further comprises adjusting the metering data according to a policy.

12. The method of claim 11, wherein the policy favors a user under a first criteria and favors a provider under a second criteria.

13. The method of claim 11, wherein the policy is expressed in terms of a mathematical model representing adjustment terms versus a criteria.

14. The method of claim 8, further comprising varying the second rate.

15. The method of claim 8, further comprising randomly varying the second rate.

16. A computer-readable storage medium having computer-executable components comprising:
   a metering component for monitoring and storing usage data;
   a logging component for writing the usage data to a non-volatile memory at a periodic rate;
   a restoration component for reading the usage data from the non-volatile memory after a recovery event; and
   a computation component for adjusting the usage data from the non-volatile memory as a function of the periodic rate to account for lost metering data caused by a recovery event.

17. A computer-readable storage medium of claim 16, further comprising a sensing component for determining a recovery event and accumulating a recovery event statistic, wherein the computation component adjusts the usage data from the non-volatile memory as a function of the periodic rate and the recovery event statistic.

18. The computer-readable storage medium of claim 17, wherein the function comprises a fraction of the periodic rate, the fraction corresponding to a comparison of the recovery event statistic and a predetermined value.

19. The computer-readable storage medium of claim 16, wherein the logging component varies the periodic rate.

20. The computer-readable storage medium of claim 16, wherein the logging component randomly varies the periodic rate.

* * * * *